US00RE45826E

(19) United States
(12) Reissued Patent
Kwon et al.

(10) Patent Number: US RE45,826 E
(45) Date of Reissued Patent: Dec. 22, 2015

(54) HEATER LAMP CONTROL APPARATUS AND METHOD TO DETECT AN INPUTTED AC VOLTAGE AND PROVIDING A PULSE SIGNAL TO CORRESPOND THERETO

(75) Inventors: Joong-gi Kwon, Gunpo-si (KR); Tae-kwon Na, Cheongju-si (KR)

(73) Assignee: SAMSUNG ELECTRONICS CO., LTD., Suwon-Si (KR)

(21) Appl. No.: 12/654,900

(22) Filed: Jan. 7, 2010

Related U.S. Patent Documents

Reissue of:
(64) Patent No.: 7,329,840
Issued: Feb. 12, 2008
Appl. No.: 10/781,655
Filed: Feb. 20, 2004

(30) Foreign Application Priority Data

May 19, 2003 (KR) ..... 10-2003-0031680

(51) Int. Cl.
*H05B 1/02* (2006.01)
*H05B 3/02* (2006.01)

(52) U.S. Cl.
CPC ..... *H05B 1/0241* (2013.01)

(58) Field of Classification Search
CPC ..... H05B 1/0241
USPC ..... 219/492, 497, 499, 501, 505, 216; 363/92; 323/300, 319
See application file for complete search history.

(56) References Cited

U.S. PATENT DOCUMENTS 3,881,085 A * 4/1975 Traister ..... 219/216
5,483,149 A * 1/1996 Barrett ..... 323/300
5,811,764 A * 9/1998 Hirst ..... 219/497
6,380,692 B1 * 4/2002 Newman et al. ..... 315/194
2004/0183469 A1 * 9/2004 Lin et al. ..... 315/247
2004/0257836 A1 * 12/2004 Porter et al. ..... 363/21.01

FOREIGN PATENT DOCUMENTS

JP 08-006434 1/1996
JP 10-333490 12/1998
KR 1999-5304 2/1999

(Continued)

OTHER PUBLICATIONS

Machine translation of 10-1999-0053719; Nov. 2014.*

(Continued)

*Primary Examiner* — Linh M Nguyen
(74) *Attorney, Agent, or Firm* — Staas & Halsey LLP

(57) ABSTRACT

A heater lamp control apparatus and method of detecting an input AC voltage and providing a pulse signal corresponding thereto, includes an AC voltage phase detection unit to detect a phase of the inputted AC voltage when a magnitude of the inputted AC voltage is over a predetermined level. The heater lamp control apparatus also includes a pulse signal generation unit to generate a pulse reference signal based on a result of the detection, a pulse delay signal that is phase-delayed, and a heater lamp control pulse signal based on a result of the comparison of the magnitudes of the pulse reference signal and the pulse delay signal. The heater lamp control pulse signal includes a control unit to control a drive-timing of the heater lamp based on the heater lamp control pulse signal. Thus, the heater lamp control apparatus minimizes a flickering phenomenon as well as an amount of electric power consumed in a heater lamp.

22 Claims, 4 Drawing Sheets

(56) References Cited

FOREIGN PATENT DOCUMENTS

| | | | |
|---|---|---|---|
| KR | 1999-005304 | | 2/1999 |
| KR | 1019990053719 | * | 11/1999 |
| KR | 2001-0048868 | | 6/2001 |
| KR | 2001-48868 | | 6/2001 |
| KR | 2002-63663 | | 8/2002 |
| KR | 2002-0063663 | | 8/2002 |

OTHER PUBLICATIONS

Office Action, mailed Jul. 27, 2005, in U.S. Appl. No. 10/781,655 (7 pp).

Office Action, mailed Jan. 12, 2006, in U.S. Appl. No. 10/781,655 (4 pp).

Office Action, mailed Jul. 10, 2006, in U.S. Appl. No. 10/781,655 (5 pp).

Final Office Action, mailed Jan. 8, 2007, in U.S. Appl. No. 10/781,655 (6 pp).

Advisory Action, mailed Apr. 2, 2007, in U.S. Appl. No. 10/781,655 (3 pp).

Notice of Allowance, mailed Sep. 19, 2007, in U.S. Appl. No. 10/781,655 (6 pp).

Korean Office Action issued Jan. 28, 2005 in corresponding Korean Application No. 10-2003-0031680.

* cited by examiner

V
PREDETERMINED LEVEL
FIG. 3A INPUT AC VOLTAGE
t
FIG. 3B PULSE REFERENCE SIGNAL
t
FIG. 3C PULSE DELAY SIGNAL
t
FIG. 3D HEATER LAMP CONTROL PULSE SIGNAL
t

HEATER LAMP CONTROL APPARATUS AND METHOD TO DETECT AN INPUTTED AC VOLTAGE AND PROVIDING A PULSE SIGNAL TO CORRESPOND THERETO

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*This application is a broadening reissue application of U.S. Pat. No. 7,329,840, which claims the benefit of U.S. application Ser. No. 10/781,655, filed with the U.S. Patent Trademark Office on Feb. 20, 2004 and issued as U.S. Pat. No. 7,329,840 Feb. 12, 2008, and earlier priority benefit to Korean Patent Application No. 2003-31680 filed with the Korean Intellectual Property Office on May 19, 2003, the disclosures of which are incorporated herein by reference.*

[This application claims the benefit of Korean Patent Application No. 2003-31680, filed on May 19, 2003, in the Korean Intellectual Property Office, the disclosure of which is incorporated herein by reference.]

BACKGROUND OF THE INVENTION

1. Field of the Invention

The present invention relates to a heater lamp control apparatus and method, and more particularly, to a heater lamp control apparatus and method to detect an inputted AC voltage and to provide a pulse signal to correspond thereto, so that a heater lamp control signal corresponding to a phase of a voltage over a predetermined level from the inputted AC voltage may be outputted.

2. Description of the Related Art

In general, an electrophotographic printer is provided with a photosensitive drum, a developing unit, a transfer unit, and a fixing unit. The tranfer unit is a unit to transfer onto a recording sheet of paper, an image formed on the photosensitive drum by a developing agent through the developing unit, and the fixing unit is a unit to fix the image transferred on the recording sheet. The fixing unit is provided to heat a surface of a fixing roller to a certain temperature. The fixing roller is mounted separately from a transfer roller to press and forward the recording sheet moving past the transfer roller. An AC voltage-driven heater lamp is generally used as a heating device to heat the surface of the fixing roller to a certain temperature.

In the related art, an AC voltage is applied to the heater lamp regardless of a phase of the applied AC voltage. Accordingly, a control unit outputs a heater lamp control signal unrelated to the phase of the AC voltage to turn on and off the application of the AC voltage, so that the phase of the AC voltage has no connection with the heater lamp control signal. Therefore, it is impossible to precisely control the applications of the AC voltage. That is, since the phases of the AC voltage may not be properly distributed, it becomes impossible to precisely control the applications of the AC voltage to be turned on and off, causing a flickering phenomenon that temporarily lowers an electric power supplied to peripheral circuits, and resulting in a problem of adversely affecting operations and stabilities of other devices provided with the peripheral circuits.

SUMMARY OF THE INVENTION

Accordingly, it is an aspect of the present invention to provide a heater lamp control apparatus and method to detect a phase of a voltage over a predetermined level and to apply the detected phase to turning on and off a heater lamp to reduce power consumption, and to detect an input AC voltage capable of minimizing an occurrence of flickering and providing a pulse signal to correspond to the detected input AC voltage.

Additional aspects and/or advantages of the invention will be set forth in part in the description which follows and, in part, will be obvious from the description, or may be learned by practice of the invention.

The foregoing and/or other aspects and advantages of the present invention are achieved by providing a heater lamp control apparatus to apply an AC voltage inputted through a power input unit to a heater lamp via a power supply unit. The heater lamp control apparatus includes an AC voltage phase detection unit to detect a phase of the inputted AC voltage when a magnitude of the inputted AC voltage is over a predetermined level, a pulse signal generation unit to generate a heater lamp control pulse signal based on a result of the detected phase, and a control unit to control a drive-timing of the heater lamp based on the generated heater lamp control pulse signal.

According to an aspect of the invention, the pulse signal generation unit generates a pulse reference signal based on a result of the detected phase, a phase-delayed pulse delay signal based on the pulse reference signal, and the heater lamp control pulse signal based on a result of a comparison of magnitudes of the pulse reference signal and the pulse delay signal.

According to an aspect of the invention, the pulse signal generation unit includes a comparator to compare magnitudes of signals inputted to a positive (+) terminal and a negative (−) terminal thereof, and a capacitor connected to the negative terminal of the comparator, to delay a phase of the pulse reference signal and to convert the phase-delayed pulse reference signal into a pulse delay signal. If the pulse reference signal is generated and outputted to the positive and negative terminals respectively, the comparator outputs the heater lamp control pulse signal to the control unit based on a result of the magnitude comparison of the pulse reference signal inputted to the positive terminal and the pulse delay signal inputted to the negative terminal.

According to an aspect of the invention, the AC voltage phase detection unit includes a zener diode having one terminal connected to an AC terminal of the power input unit, to turn on when a voltage over a predetermined level is inputted, and a light-emitting element having one terminal connected to the other terminal of the zener diode, to emit light based on an input current occurring when the zener diode turns on. If the magnitude of the AC voltage is over the predetermined level, the phase detection is performed based on the light-emitting of the light-emitting element due to the input current occurring when the zener diode turns on.

According to an aspect of the invention, the pulse signal generation unit further includes a light-receiving element to turn on based on the light-emitting of the light-emitting element, and to generate the pulse reference signal.

The foregoing and/or other aspects and advantages of the present invention are achieved by providing a heater lamp control method of applying an AC voltage inputted through a power input unit to a heater lamp via a power supply unit including detecting a phase of the inputted AC voltage when a magnitude of the inputted AC voltage is over a predetermined level, generating a heater lamp control pulse signal based on a result of the detection, and controlling a drive-timing of the heater lamp based on the generated heater lamp control pulse signal.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
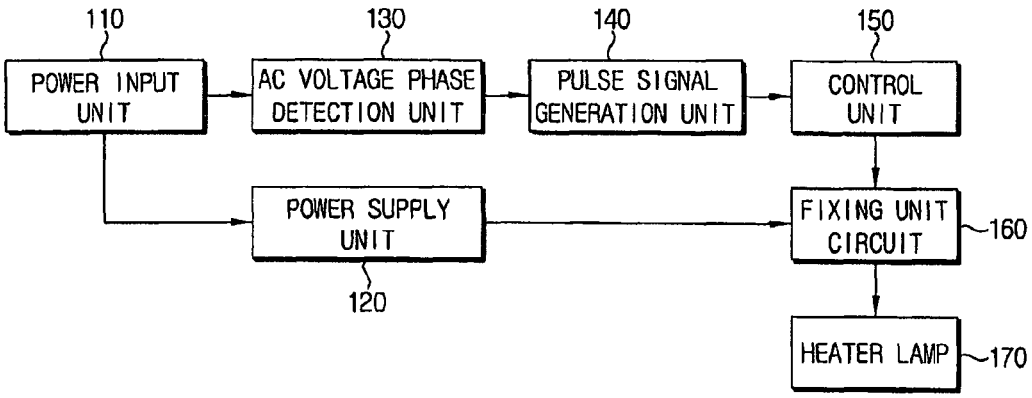
FIG. 1 is a block diagram showing a heater lamp control apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram showing a heater lamp control apparatus, according to an embodiment of the present invention.

The heater lamp control apparatus includes an power input unit 110, a power supply unit 120, an AC voltage phase detection unit 130, a pulse signal generation unit 140, a control unit 150, a fixing unit circuit 160, and a heater lamp 170.

The power input unit 110 refers in general to a power cord, and an AC voltage inputted through the power input unit 110 is outputted to the AC voltage phase detection unit 130 and the power supply unit 120, respectively.

The power supply unit 120, for example, a switching mode power supply (SMPS), is a power supply device to generate various voltages necessary for a printer, and supplies a voltage to the fixing unit circuit 160 to be described later. Preferably, the power supply unit 120 is 110V/220V-switchable.

The AC voltage phase detection unit 130 detects a magnitude of an AC voltage according to a phase of the AC voltage based on the inputted AC voltage, and detects the phase if a corresponding voltage satisfies a predetermined condition. That is, if the magnitude of the detected AC voltage is over a predetermined level, the AC voltage phase detection unit 130 detects a phase of the AC voltage, and generates a pulse reference signal based on a detected result. Further, the generated pulse reference signal is outputted to the pulse signal generation unit 140. The predetermined level may be adjusted depending upon an amount of power supply.

The pulse signal generation unit 140 generates a pulse delay signal based on an inputted pulse reference signal. Further, the pulse signal generation unit 140 compares magnitudes of the generated pulse delay signal and the inputted pulse reference signal. Thereafter, the pulse signal generation unit 140 generates a heater lamp control pulse signal based on a difference of the magnitudes. The generated heater lamp control pulse signal is outputted to the control unit 150.

The control unit 150 is a unit to control a printer. In the present invention, the control unit 150 controls the fixing unit circuit 160 based on the inputted heater lamp control pulse signal. That is, the control unit 150 controls the fixing unit circuit 160 to be switched on and off according to pulses in the heater lamp control pulse signal so that a voltage supplied from the power supply unit 120 is applied to the heater lamp 170.

The heater lamp 170 may be built in a predetermined location, for example, in a fixing roller, to heat the fixing roller (not shown).

Figure 2:
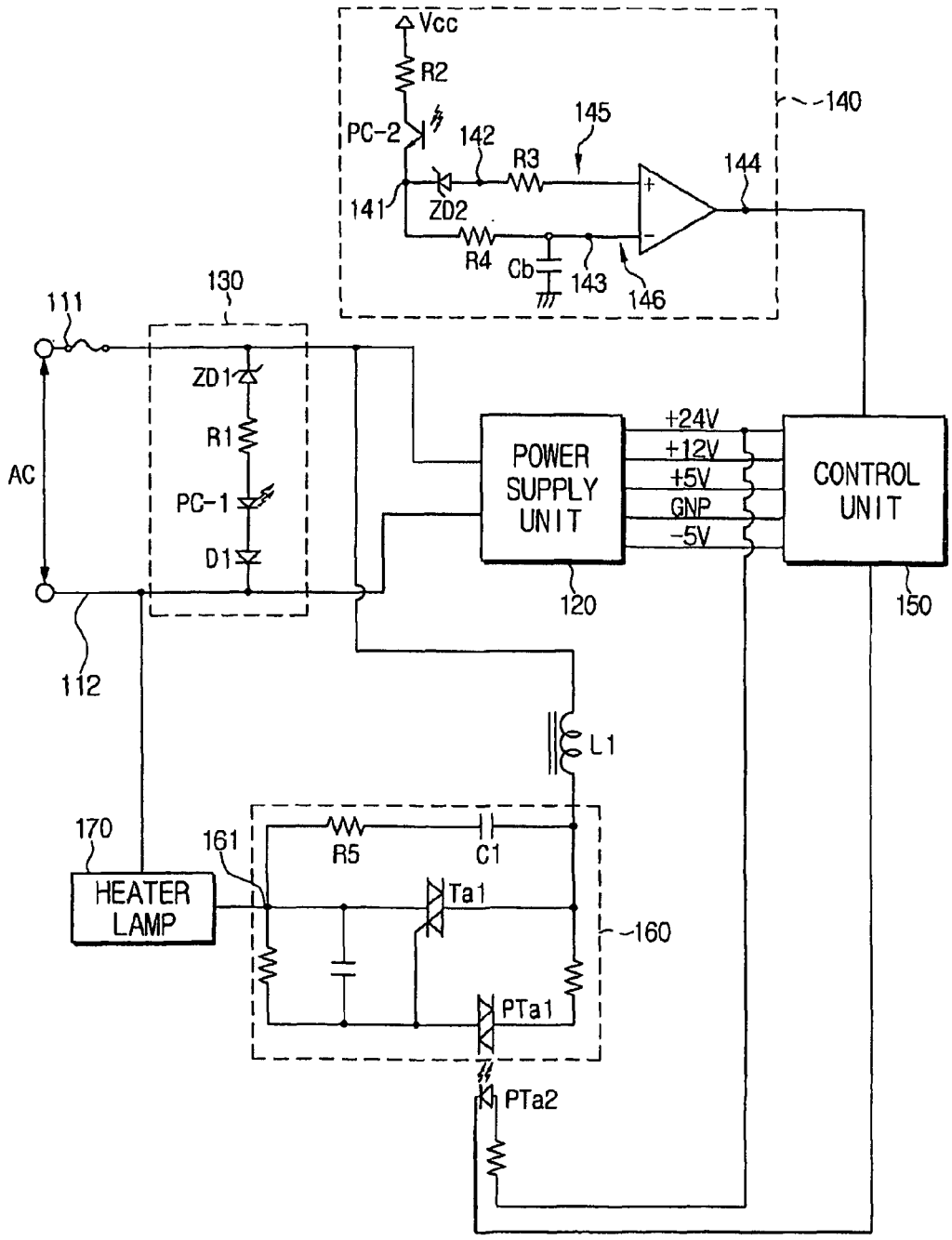
FIG. 2 is a view showing a circuit for the heater lamp control apparatus of FIG. 1 having an AC voltage phase detection unit and a pulse signal generation unit.

FIG. 2 is a view showing a circuit for the heater lamp control apparatus of FIG. 1 having an AC voltage phase detection unit and a pulse signal generation unit according to an embodiment of the present invention, and FIGS. 3A through 3D are timing diagrams showing an input AC voltage and signals.

An AC voltage inputted through the power input unit 110 is inputted through a first AC terminal 111 and a second AC terminal 112. Further, a predetermined phase is detected depending upon a magnitude of the inputted voltage through the AC voltage phase detection unit 130.

The AC voltage phase detection unit 130 has a zener diode ZD1, a resistor R1, a light-emitting diode PC-1, and a diode D1 connected in series between the first AC terminal 111 and the second AC terminal 112 in order for electrical current to flow from the first AC terminal 111 to the second AC terminal 112. The light-emitting diode PC-1 is one element of a photocoupler PC paired with a photo transistor PC-2 of the pulse signal generation unit 140. A trigger voltage of the zener diode ZD1 is set to a predetermined level.

The AC voltage phase detection unit 130, in a case in which a magnitude of a voltage at every phase of the input voltage is over the trigger voltage of the zener diode ZD1 (that is, over the predetermined level), allows an electrical current to flow therethrough, and, accordingly, the electrical current flows into the light-emitting diode PC-1 so that the light-emitting diode PC-1 is lit. Further, when the light-emitting diode PC-1 is lit, the photo transistor PC-2 of the pulse signal generation unit 140 is turned on. On the contrary, in a case in which the magnitude of the voltage is below the predetermined level, the zener diode ZD1 is turned off so that a current path is not formed.

The pulse signal generation unit 140 has one terminal connected to the power supply unit 120 and the other terminal connected to the control unit 150. A resistor R2 and the photo transistor PC-2 are connected in series between one terminal connected to the power supply unit 120 and a junction node 141. The other terminal connected to the control unit 150 is connected to an output terminal of a comparator. Branches are formed in parallel from the junction node 141 for positive (+) and negative (−) terminals of the comparator. A zener diode ZD2 and a resistor R3 are connected in series to a first branch 145 which is a branch connected to the positive terminal of the comparator. A resistor R4 is connected to a second branch 146 which is a branch connected to the negative terminal of the comparator, and a capacitor Cb with one terminal grounded is connected between the resistor R4 and the negative terminal of the comparator. The zener diode ZD2 is disposed to reduce a magnitude of a constant input voltage, and the resistors R2, R3, and R4 are disposed to drop voltage levels.

The photo transistor PC-2 is turned on according to the light-emitting of the light-emitting diode PC-1, which is a light-emitting element of the AC voltage phase detection unit 130, and, accordingly, a pulse reference signal, which is a rectangular pulse signal, is generated. The generated pulse reference signal is inputted to the first and second branches 145 and 146 via the junction node 141, respectively. The pulse reference signal is a rectangular pulse signal that makes the pulse reference signal "high" in a region for an AC voltage to have a voltage over the trigger voltage of the zener diode ZD1. The inputted pulse reference signal is inputted via the first branch 145 to the positive terminal of the comparator without any phase delay. On the contrary, the pulse reference signal is temporarily delayed in phase via the second branch 146 while the capacitor Cb is charged, and inputted to the negative terminal of the comparator in a phase-delayed state. The phase-delayed pulse reference signal is referred to as a pulse delay signal in the present invention. The capacitor Cb serves as a buffer, and may vary its capacity depending upon a pulse width of the heater lamp control pulse signal.

The comparator compares the pulse reference signal and the pulse delay signal that are respectively inputted to the positive and negative terminals thereof, and generates and outputs a predetermined heater lamp control pulse signal to the control unit 150.

The heater lamp control pulse signal is generated as follows. That is, only the pulse reference signal is inputted to the positive terminal of the comparator while the pulse delay signal is delayed by the capacitor Cb, so a signal of "high" is outputted from the output terminal of the comparator. Further, if the capacitor Cb at the negative terminal side is completely charged, a voltage of the pulse reference signal is dropped by a predetermined amount at the positive terminal side due to the zener diode ZD2. Thus, the pulse reference signal at the negative terminal becomes larger than the pulse reference signal at the positive terminal, and a signal of "low" is outputted from the output terminal of the comparator, generating the heater lamp control pulse signal.

The control unit 150 outputs a heater lamp control signal to control the fixing unit circuit 160 to be turned on and off based on a predetermined heater lamp control pulse signal.

The fixing unit circuit 160 is connected between a terminal 161 of the heater lamp 170 and the first AC terminal 111, and the fixing unit circuit 160 has a branch to connect a capacitor C1 and a resistor R5, a triac Ta1 connected in parallel with the branch, and a photo triac PTa1 to trigger a gate terminal of the triac Ta1. A light-emitting diode PTa2 paired with the photo triac PTa1 is mounted to emit light by the heater lamp control signal of the control unit 150.

Accordingly, the terminal 161 of the heater lamp 170 is electrically connected or disconnected with an inductor L1 connected to the first AC terminal 111 by the photo triac Ta1 that turns on and off depending upon whether or not the light-emitting diode PTa2 emits light according to the heater lamp control signal of the controller 150. The inductor, capacitor, and resistor denoted with the reference numerals L1, C1, and R5, respectively, are used for noise elimination and frequency compensation.

The heater lamp control apparatus controls the application of an AC voltage to the heater lamp 170 based on the output signals of the AC voltage phase detection unit 130 and the pulse signal generation unit 140.

Further, in FIG. 2 and FIGS. 3A through 3D, a process to generate the heater lamp control pulse signal based on the heater lamp control signal is shown.

Figure 3:
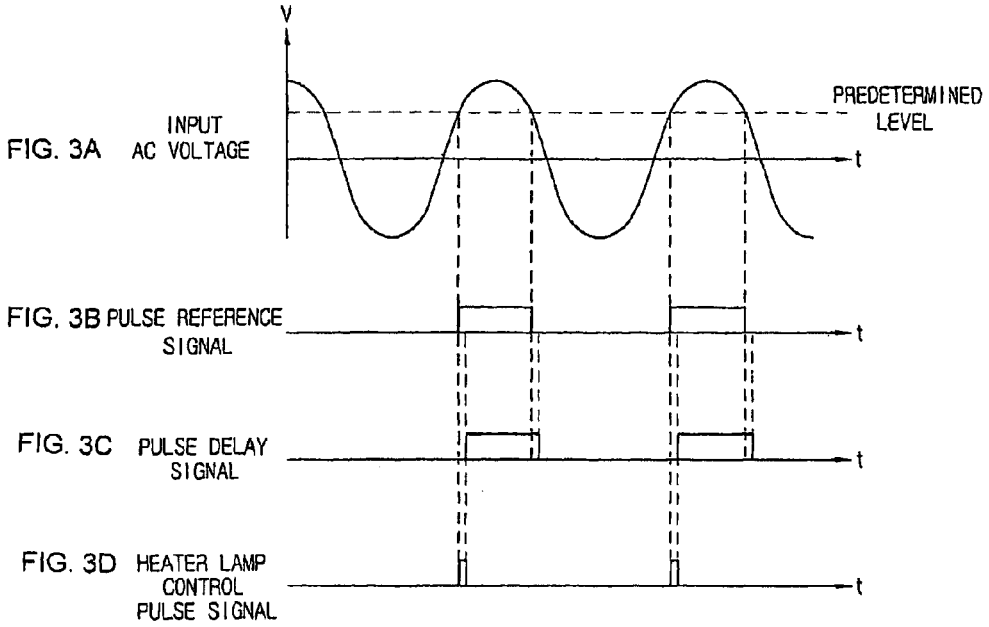
FIGS. 3A through 3D are timing diagrams showing an input AC voltage and signals.

That is, when an AC voltage is inputted through the power input unit 110, a pulse reference signal is generated from the photo transistor PC-2 due to the zener diode ZD1 and photo diode PC-1 of the AC voltage phase detection unit 130, and the pulse reference signal is phase-delayed again by the capacitor Cb to a pulse delay signal. Further, a heater lamp control pulse signal is generated and outputted through the comparator. FIG. 3A shows a waveform of the inputted AC voltage signal. A signal having a waveform such as the pulse reference signal of FIG. 3B passes through the first node 141 of the pulse signal generation unit 140 of FIG. 2, a signal having a waveform such as the pulse delay signal of FIG. 3C passes through the second node 143, and a signal having a waveform such as the heater lamp control pulse signal of FIG. 3D passes through the third node 144.

Figure 4:
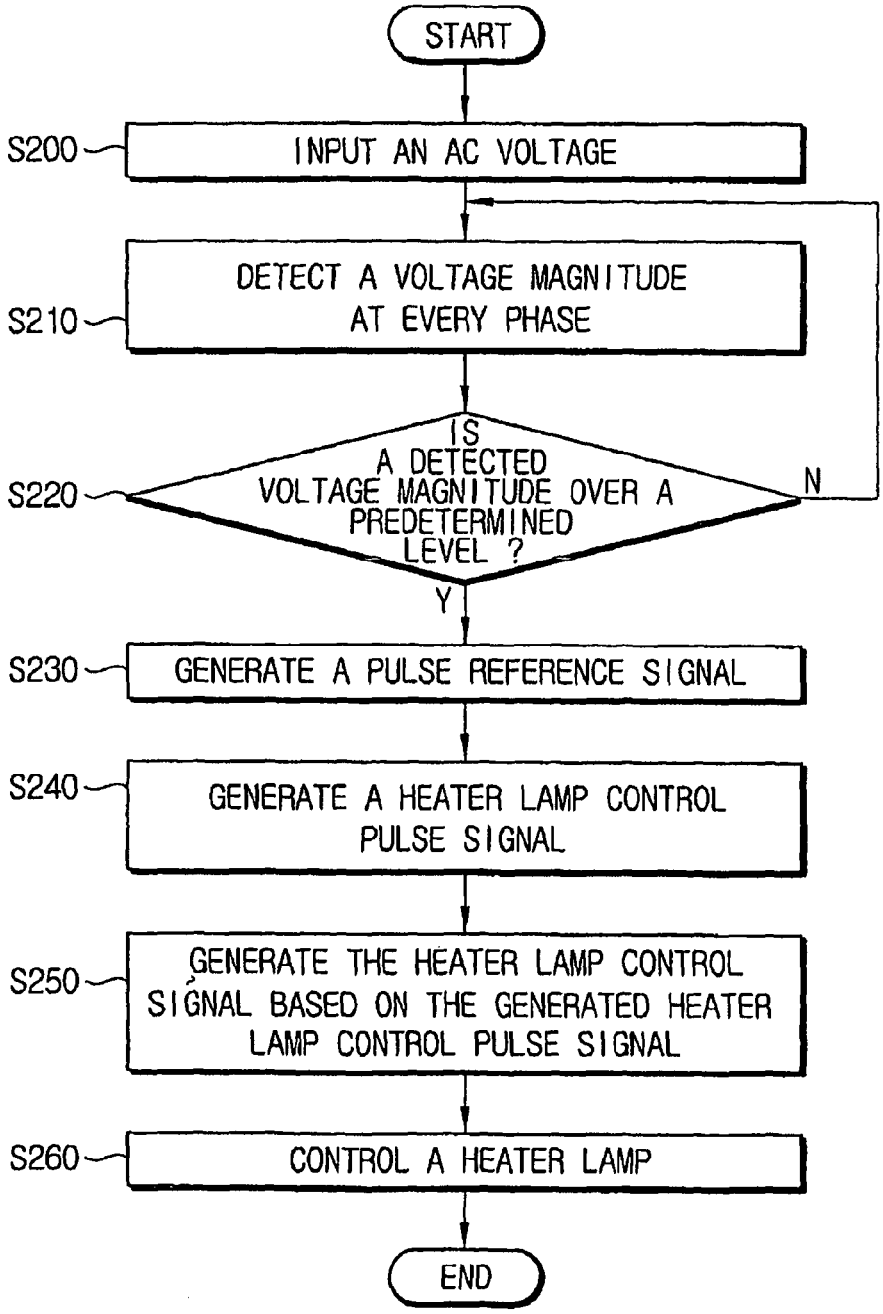
FIG. 4 is a flow chart showing a heater lamp control method.

FIG. 4 is a flow chart showing a heater lamp control method, according to an embodiment of the present invention.

An AC voltage is inputted through the power input unit 110 (in operation S200). The AC voltage phase detection unit 130 detects a magnitude of the inputted AC voltage at every phase (in operation S210). Further, the AC voltage phase detection unit 130 decides whether the detected voltage magnitude is over a predetermined level (in operation S220). If the detected voltage magnitude is not over the predetermined level, the AC voltage phase detection unit 130 detects a voltage magnitude at the next phase for the decision. If the detected voltage magnitude is over the predetermined level, the AC voltage phase detection unit 130 transfers a result to the pulse signal generation unit 140. The pulse signal generation unit 140 generates a pulse reference signal based on the transferred result (in operation S230). The comparator compares the magnitudes of the generated pulse reference signal and a phase-delayed pulse delay signal, and generates and outputs a heater lamp control pulse signal to the control unit 150 (in operation S240). Thereafter, the control unit 150 generates a heater lamp control signal based on the heater lamp control pulse signal to control the fixing unit circuit 160 and the heater lamp 170 (in operations S250 and S260).

In light of the above process, only voltages that exceed the predetermined level are applied to turn on the heater lamp 170.

As described above, the present invention selects a voltage supplied from the input voltage to the heater lamp so that only predetermined high voltages are applied to the heater lamp. Accordingly, the heater lamp control apparatus of the present invention minimizes a flickering phenomenon which may occur in peripheral devices as well as an amount of electric power the heater lamp consumes.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A heater lamp control apparatus to apply an AC voltage inputted through a power input unit to a heater lamp via a power supply unit, comprising:

an AC voltage phase detection unit to detect a phase of the inputted AC voltage when a magnitude of the inputted AC voltage is over a predetermined level;

a pulse signal generation unit to generate a heater lamp control pulse signal based on a result of the detection; and a control unit to control a drive-timing of the heater lamp based on the generated heater lamp control pulse signal, wherein the pulse signal generation unit generates a pulse reference signal based on a result of the detection, a phase-delayed pulse delay signal based on the pulse reference signal, and the heater lamp control pulse signal based on a result of a comparison of magnitudes of the pulse reference signal and the pulse delay signal.

2. The heater lamp control apparatus as claimed in claim 1, wherein the pulse signal generation unit comprises:

a comparator to compare magnitudes of signals inputted to a positive terminal and a negative terminal thereof; and a capacitor connected to the negative terminal of the comparator, to delay a phase of the pulse reference signal and to convert the phase-delayed pulse reference signal into the pulse delay signal, and if the pulse reference signal is generated and outputted to the positive and negative terminals respectively, the comparator outputs the heater lamp control pulse signal to the control unit based on a result of the magnitude comparison of the pulse reference signal inputted to the positive terminal and the pulse delay signal inputted to the negative terminal.

3. The heater lamp control apparatus as claimed in claim 1, wherein the AC voltage phase detection unit comprises:

a zener diode having one terminal connected to an AC terminal of the power input unit, to turn on when a voltage over a predetermined level is inputted; and a light-emitting element having one terminal connected to the other terminal of the zener diode, to emit light based on an input current occurring when the zener diode turns on, and if the magnitude of the AC voltage is over the predetermined level, the phase detection is performed based on the light-emitting of the light-emitting element due to the input current occurring when the zener diode turns on.

4. The heater lamp control apparatus as claimed in claim 3, wherein the pulse signal generation unit further comprises:

a light-receiving element to turn on based on the light-emitting of the light-emitting element and to generate the pulse reference signal.

5. The heater lamp control apparatus as claimed in claim 1, wherein the control unit controls a fixing unit circuit to be switched on and off according to pulses in the heater lamp control pulse signal so that a voltage supplied from the power supply unit is applied to the heater lamp.

6. A heater lamp control method of applying an AC voltage inputted through a power input unit to a heater lamp via a power supply unit, comprising:

detecting a phase of the inputted AC voltage when a magnitude of the inputted AC voltage is over a predetermined level;

generating a heater lamp control pulse signal based on a result of the detection, wherein the generating the heater lamp, control pulse signal comprises:

generating a pulse reference signal based on a result of the detection;

converting the generated pulse reference signal into a phase-delayed pulse delay signal based on the pulse reference signal; and generating a heater lamp control pulse signal based on a result of a comparison of magnitudes of the pulse reference signal and the pulse delay signal; and controlling a drive-timing of the heater lamp based on the generated heater lamp control pulse signal.

7. The heater lamp control method as claimed in claim 6, wherein the converting the generated pulse reference signal into a phase-delayed pulse delay signal comprises:

outputting the generated pulse reference signal to positive and negative terminals of a comparator; and delaying a phase of the pulse reference signal by a capacitor connected to the negative terminal and converting the phase-delayed pulse reference signal into a pulse delay signal, and the generating the heater lamp control pulse signal comprises:

comparing magnitudes of the pulse reference signal inputted to the positive terminal and the pulse delay signal converted at the negative terminal, and generating the heater lamp control pulse signal based on a result of the comparison.

8. The heater lamp control method as claimed in claim 6, wherein the detecting the phase of the inputted AC voltage comprises:

turning on a zener diode to allow current to flow when a voltage over a predetermined level is inputted; and emitting light from a light-emitting element based on an input current occurring when the zener diode turns on, and the phase detection is performed based on the light-emitting of the light-emitting element due to the input current occurring when the zener diode turns on.

9. The heater lamp control method as claimed in claim 8, wherein the generating the pulse reference signal further comprises:

generating the pulse reference signal when a light-receiving element turns on based on the light-emitting of the light-emitting element.

*10. A heater lamp control apparatus for use in an image forming apparatus to controllably apply an AC voltage inputted through a power input unit to a heater lamp of the image forming apparatus to reduce flicker occurrences, the heater lamp control apparatus comprising:*

*an AC voltage phase detection unit to detect a phase of the inputted AC voltage when a magnitude of the inputted AC voltage is over a predetermined level;*

*a pulse signal generation unit to generate a heater lamp control pulse signal based on a result of the detection; and*

*a control unit to control a drive-timing of the heater lamp of the image forming apparatus based on the generated heater lamp control pulse signal,*

*wherein the AC voltage phase detection unit comprises a light-emitting element to emit light when the magnitude of the inputted AC voltage is over the predetermined level, and wherein the pulse signal generation unit comprises a light-receiving element to detect light emitted by the light-emitting element and to generate the heater lamp control pulse signal based on detection of light emitted by the light-emitting element.*

*11. The heater lamp control apparatus as claimed in claim 10, wherein the AC voltage phase detection unit comprises:*

*a diode having one terminal connected to an AC terminal of the power input unit, to turn on when a voltage greater than a predetermined level is inputted.*

*12. The heater lamp control apparatus as claimed in claim 10, wherein the control unit controls a fixing unit circuit to be switched on and off according to pulses in the heater lamp control pulse signal so that a voltage supplied from the power supply unit is applied to the heater lamp.*

*13. A heater lamp control method for use in an image forming apparatus for controllably applying an AC voltage inputted through a power input unit to a heater lamp to reduce flicker occurrences, the method comprising:*

*detecting a phase of the inputted AC voltage when a magnitude of the inputted AC voltage is over a predetermined level;*

*generating a heater lamp control pulse signal based on a result of the detection; and*

*controlling a drive-timing of the heater lamp of the image forming apparatus based on the generated heater lamp control pulse signal,*

*wherein the detecting the phase of the inputted AC voltage comprises emitting light from a light-emitting element when the magnitude of the AC voltage is over the predetermined level, and*

*wherein the generating the heater lamp control pulse signal comprises using a light-receiving element to detect light emitted by the light-emitting element and generating the heater lamp control pulse signal based on detection of light emitted by the light-emitting element.*

*14. The heater lamp control method as claimed in claim 13, wherein the detecting the phase of the inputted AC voltage further comprises:*

*turning on a zener diode to allow current to flow when a voltage over a predetermined level is inputted.*

*15. The heater lamp control apparatus as claimed in claim 10, wherein the pulse signal generation unit generates a pulse reference signal based on a result of the detection, a phase-delayed pulse delay signal based on the pulse reference signal, and the heater lamp control pulse signal based on a result of a comparison of magnitudes of the pulse reference signal and the pulse delay signal.*

*16. The heater lamp control apparatus as claimed in claim 15, wherein the pulse signal generation unit further comprises:*

*a comparator to compare magnitudes of signals inputted to a positive terminal and a negative terminal thereof; and*

*a capacitor connected to the negative terminal of the comparator, to delay a phase of the pulse reference signal and to convert the phase-delayed pulse reference signal into the pulse delay signal, and if the pulse reference signal is generated and outputted to the positive and negative terminals respectively, the comparator outputs the heater lamp control pulse signal to the control unit based on a result of the magnitude comparison of the pulse reference signal inputted to the positive terminal and the pulse delay signal inputted to the negative terminal.*

*17. The heater lamp control apparatus as claimed in claim 11, wherein the light-emitting element having one terminal connected to the other terminal of the zener diode, to emit light based on an input current occurring when the zener diode turns on, and if the magnitude of the AC voltage is over the predetermined level, the phase detection is performed based on the light-emitting of the light-emitting element due to the input current occurring when the zener diode turns on.*

*18. The heater lamp control method as claimed in claim 13, wherein the generating the heater lamp control pulse signal comprises:*

*generating a pulse reference signal based on a result of the detection;*

*converting the generated pulse reference signal into a phase-delayed pulse delay signal based on the pulse reference signal; and*

*generating a heater lamp control pulse signal based on a result of a comparison of magnitudes of the pulse reference signal and the pulse delay signal.*

*19. The heater lamp control method as claimed in claim 18, wherein the converting the generated pulse reference signal into a phase-delayed pulse delay signal comprises:*

*outputting the generated pulse reference signal to positive and negative terminals of a comparator; and*

*delaying a phase of the pulse reference signal by a capacitor connected to the negative terminal and converting the phase-delayed pulse reference signal into a pulse delay signal, and the generating the heater lamp control pulse signal comprises:*

*comparing magnitudes of the pulse reference signal inputted to the positive terminal and the pulse delay signal converted at the negative terminal, and generating the heater lamp control pulse signal based on a result of the comparison.*

*20. The heater lamp control apparatus as claimed in claim 11, wherein the diode is a zener diode.*

*21. A heater lamp control apparatus for use in an image forming apparatus to controllably apply an AC voltage inputted through a power input unit to a heater lamp of the image forming apparatus to reduce flicker occurrences, the heater lamp control apparatus comprising:*

*an AC voltage phase detection unit to detect a phase of the inputted AC voltage when a magnitude of the inputted AC voltage is over a predetermined level;*

*a pulse signal generation unit to generate a heater lamp control pulse signal based on a result of the detection; and*

*a control unit to control a drive-timing of the heater lamp of the image forming apparatus based on the generated heater lamp control pulse signal,*

*wherein the AC voltage phase detection unit comprises a diode having one terminal connected to an AC terminal of the power input unit, to turn on when a voltage greater than a predetermined level is inputted, and a light-emitting element connected in series with the diode, to emit light when the magnitude of the inputted AC voltage is over the predetermined level, and wherein the pulse signal generation unit comprises a light-receiving element to detect light emitted by the light-emitting element and to generate the heater lamp control pulse signal based on detection of light emitted by the light-emitting element.*

*22. The heater lamp control apparatus as claimed in claim 21, wherein the AC voltage phase detection unit further comprises a resistance connected in series with the diode and the a light-emitting element.*

* * * * *